United States Patent
Eubanks et al.

(10) Patent No.: US 10,440,895 B2
(45) Date of Patent: Oct. 15, 2019

(54) MOTOR-DRIVE FOR APPLICATION OF WRAP MATERIAL TO CROP PACKAGES

(71) Applicant: Deere & Company, Moline, IL (US)

(72) Inventors: Jason C. Eubanks, Hedrick, IA (US); Gerald Shook, Fairfield, IA (US)

(73) Assignee: DEERE & COMPANY, Moline, IL (US)

( * ) Notice: Subject to any disclaimer, the term of this patent is extended or adjusted under 35 U.S.C. 154(b) by 671 days.

(21) Appl. No.: 14/827,570

(22) Filed: Aug. 17, 2015

(65) Prior Publication Data
US 2017/0049058 A1 Feb. 23, 2017

(51) Int. Cl.
*A01F 15/07* (2006.01)

(52) U.S. Cl.
CPC .... *A01F 15/0715* (2013.01); *A01F 2015/072* (2013.01); *A01F 2015/076* (2013.01); *A01F 2015/0725* (2013.01)

(58) Field of Classification Search
CPC .............. A01F 2015/076; A01F 15/071; A01F 15/0715; A01F 15/072; B65B 11/00; B65B 11/04
USPC ...................... 53/441, 430, 587, 203, 211, 64
See application file for complete search history.

(56) References Cited

U.S. PATENT DOCUMENTS

| | | | |
|---|---|---|---|
| 4,022,120 A | 5/1977 | McAllister | |
| 4,624,179 A * | 11/1986 | Yves | A01F 15/141 100/13 |
| 5,979,146 A * | 11/1999 | Orpen | B65B 11/04 53/441 |
| 6,006,504 A * | 12/1999 | Myers | A01F 15/0715 53/556 |
| 6,035,773 A * | 3/2000 | Rempe | A01F 15/141 100/13 |
| 6,634,284 B2 | 10/2003 | Parker | |
| 6,774,805 B1 * | 8/2004 | Viesselmann | A01F 15/0715 340/675 |
| 8,028,499 B2 * | 10/2011 | Viaud | A01F 15/071 100/4 |
| 8,807,023 B2 | 8/2014 | Biziorek et al. | |
| 2014/0053510 A1 * | 2/2014 | Smith | A01F 15/0715 53/461 |

FOREIGN PATENT DOCUMENTS

WO  2015035375 A1  3/2015

OTHER PUBLICATIONS

European Search Report, Application No. 16181918.0-1655, Deere & Company, dated Oct. 31, 2016.

* cited by examiner

*Primary Examiner* — Chelsea E Stinson
(74) *Attorney, Agent, or Firm* — Klintworth & Rozenblat IP LLP (57) ABSTRACT

A system and a method for moving wrap material in a baler are described. A motor can be secured to the baler and can be configured to rotate a wrap roller of the baler. The motor can be caused to rotate the wrap roller in a first direction, such that the wrap roller moves the wrap material towards a crop package contained by the baler. The motor can also be caused, during application of the wrap material to the crop package, to brake the wrap roller relative to the first roller direction or to rotate the wrap roller in a second direction that is opposite the first direction, in order to stretch the wrap material.

18 Claims, 4 Drawing Sheets

MOTOR-DRIVE FOR APPLICATION OF WRAP MATERIAL TO CROP PACKAGES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to wrapping crop packages, including bales of crop material formed in round balers.

BACKGROUND OF THE DISCLOSURE

In agricultural and other applications, it may be useful to wrap crop packages with wrap material. For example, certain types of wrap material can help hold crop packages together and can protect crop packages from environmental elements such as rain and other moisture sources.

In conventional baling systems, relatively complex mechanical arrangements are used to move wrap material from a storage roll to a baling chamber, such that a bale within the baling chamber can be wrapped. For example, a belt-drive can be used to link the mechanical drive of a baler to a feed roller for net wrap. The feeding of net wrap to a baling chamber can accordingly be controlled by mechanical engagement, or disengagement, of a relevant belt. However, this arrangement may not be particularly well disposed to fine-tuned control of net wrap movement (e.g., net wrap feed rate or stretch). Further, such complex arrangement can require significant calibration and maintenance, which can reduce the time available for agricultural workers to actually gather and wrap crop material. Conventional systems can also be difficult or impossible to fine-tune or otherwise calibrate during active operation, and can be limited to only a single powered rotational direction.

SUMMARY OF THE DISCLOSURE

A system and a method for moving wrap material are disclosed.

According to one aspect of the disclosure, a system can move wrap material for agricultural crop packages within a baler with a wrap roller. A motor can be secured to the baler and can be configured to rotate the wrap roller. A controller can be configured to cause the motor to rotate the wrap roller in a first direction, such that the wrap roller moves the wrap material towards a crop package contained by the baler. The controller can also be configured to cause the motor, during application of the wrap material to the crop package, to brake the wrap roller relative to the first roller direction or to rotate the wrap roller in a second direction that is opposite the first direction, in order to stretch the wrap material.

According to another aspect of the disclosure, a method can be used to move wrapping system can be used to move wrap material for agricultural crop packages within a baler with a wrap roller and a motor configured to rotate the wrap roller. The motor can be caused to rotate the wrap roller in a first direction, such that the wrap roller moves the wrap material towards a crop package contained by the baler. During application of the wrap material to the crop package, the motor can further be caused to brake the wrap roller relative to the first roller direction or to rotate the wrap roller in a second direction that is opposite the first direction, in order to stretch the wrap material.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As noted above, conventional systems for moving wrap material can exhibit various deficiencies. The method and system described herein can provide improved control of the movement of wrap material, including in the feeding, stretching, cutting, and retraction of wrap material in round balers.

Figure 1:
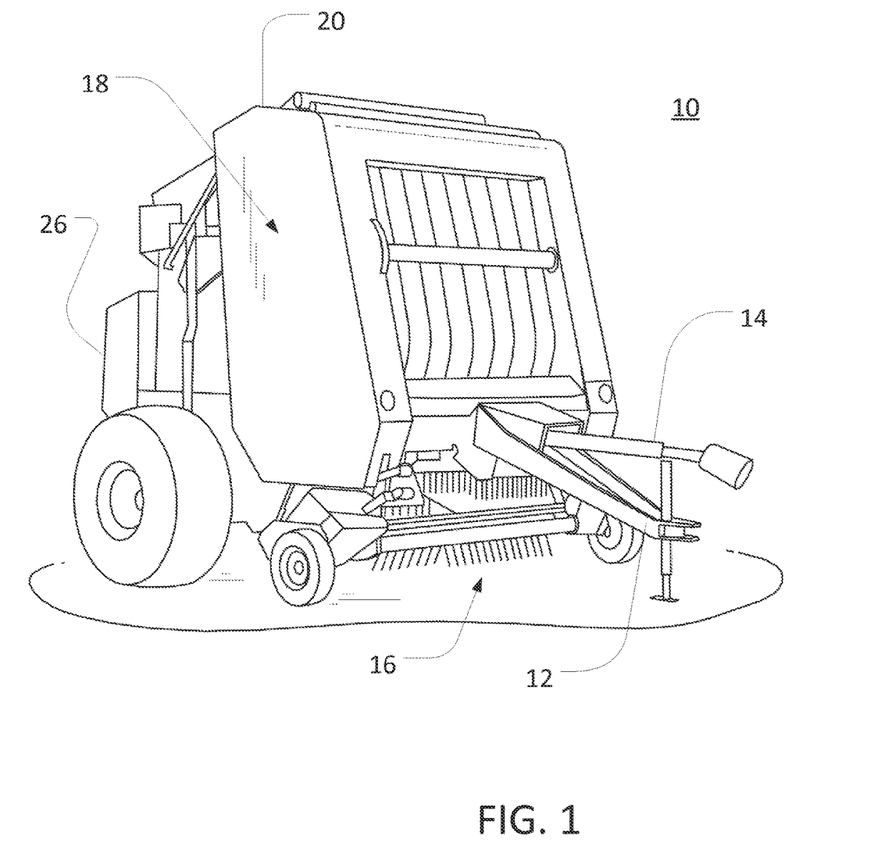
FIG. 1 is a right perspective view of an agricultural baler with which the disclosed system and method can be used.

FIG. 1 illustrates an example round baler 10 for forming crop packages configured as round bales. Various examples herein may present the disclosed system and method with respect to the baler 10 and the formation and wrapping of round bales. It will be understood, however, that the baler 10 is presented as an example only and that the disclosed system and method can be applied with respect to other round balers, other crop-packaging devices with corresponding crop packages, or various other machinery.

In the embodiment illustrated in FIG. 1, the baler 10 includes a tongue 12 so that baler 10 may be towed during operation by a separate vehicle (e.g., an agricultural work vehicle such as a tractor (not shown)). The baler 10, in certain embodiments, may receive power from such a vehicle via a PTO connection 14, which may be connected in various known ways to a PTO shaft of the vehicle (not shown). As the baler 10 moves (e.g., is towed) across a field, cut crop material may be gathered by an intake assembly 16 and guided into a baling chamber 18 within a frame 20 of the baler 10. Within the chamber 18, various rollers can rotate to move belts (not shown in FIG. 1) to rotate and compress the gathered material into a generally cylindrical (or "round") bale (not shown). Alternatively, various rollers themselves, rather than in conjunction with belts or other devices, may be used to create density and form the bale, in what may be referred to as a "fixed chamber baler".

Figure 2:
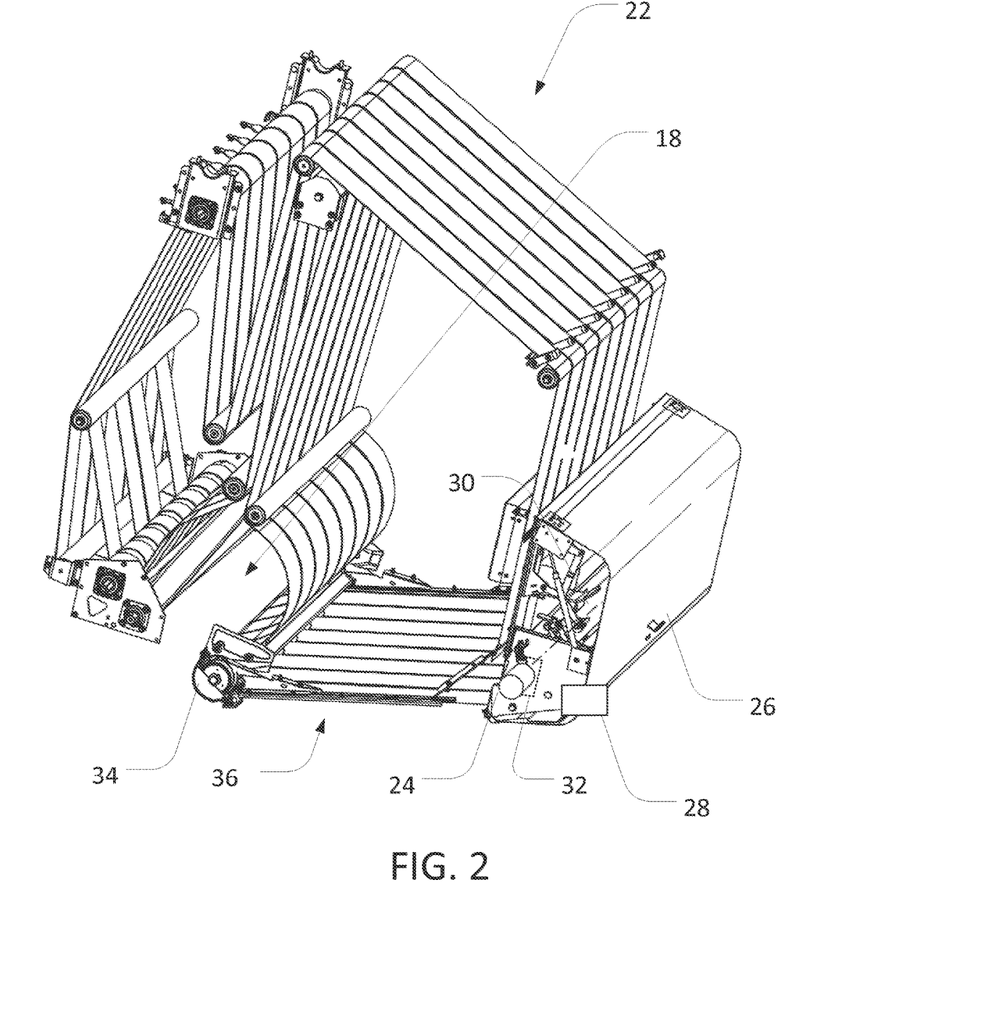
FIG. 2 is a left perspective view of certain components of the baler of FIG. 1, including a motor arranged according to one embodiment of the disclosed system.
Figure 3:
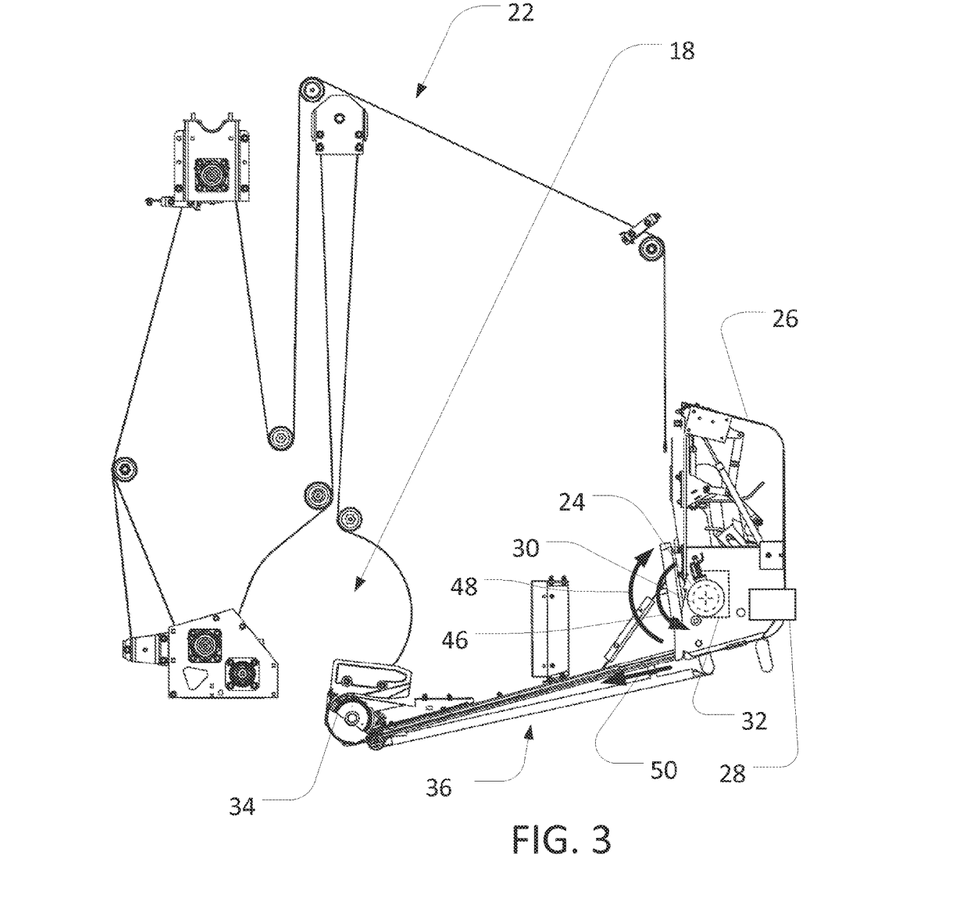
FIG. 3 is a side elevational view of the components of FIG. 2, including the motor.

FIGS. 2 and 3 illustrate certain internal mechanisms of the baler 10, including a belt arrangement 22 for rotating and compressing crop material into a round bale. In the embodiment illustrated, a motor 24 is secured at a rear portion of the baler 10 near a rear cover 26. It should be noted that the net wrap system, and thus the motor 24, may be mounted at another location in the baler, for example, at the front of the baler or at other locations at the rear of the baler, such as a higher or lower location of the rear cover. In some embodiments, the cover 26 can be opened in order to load a roll of wrap material (not shown), such as net wrap. As illustrated in FIGS. 2 and 3, the motor 24 can be an electrical motor drawing power from an electrical system of the towing vehicle (or another power source). For example, the motor 24 can be configured as a pancake-style electrical motor of appropriate power. In other embodiments, other types of motors can be used, including hydraulic motors. Generally, the motor 24 is configured to drive rotation of a wrap roller 30, which can be configured as a rubber or other roller. In some embodiments, a gearbox (e.g., a gearbox 32 as illustrated in FIGS. 2 and 3) can be interposed between the motor 24 and the roller 30, such that the roller 30 can rotate at a different speed than the output of the motor 24.

In some embodiments, the baler 10 (or a vehicle towing the baler 10) can include a controller 28, which can include one or more computing devices such as various processor devices and various associated memory architectures. In certain embodiments, the controller 28 can additionally (or alternatively) include various other electronic control circuits and devices (e.g., various power electronics devices or programmable circuits). The controller 28 can be disposed separately from other components (e.g., as shown in FIGS. 2 and 3) or can be integrated into various components (e.g., the motor 24). In some embodiments, the controller 28 can be dedicated solely to the functionality disclosed herein. In some embodiments, the controller 28 can be configured to provide other functionality in addition to the control functions disclosed herein.

In some embodiments, the controller 28 can be in communication with various other devices of the baler 10, a vehicle towing the baler 10, or other platforms. As illustrated, the controller 28 is in communication with the motor 24, such that the controller 28 can receive signals from and provide control signals to the motor 24. The controller can also be in communication with various sensors, actuators, or other devices distributed on the baler 10, or elsewhere. For example, the controller 28 can be in communication with rotational sensors on (or otherwise configured to monitor) the roller 30, another roller of the baler 10 (e.g., a roller 34), the PTO shaft 14, and so on, using sensing techniques either internal or external to the motor 24.

Generally, the controller 28 (or another control device) can be used to execute a method of moving net wrap material through the machine using the roller 30. When a bale formed within the baling chamber 18 is ready to be wrapped, the controller 28 can cause the motor 24 to start to rotate in a first, feed direction 46 (e.g., counter-clockwise, from the perspective of FIG. 3). This can cause wrap material (e.g., net wrap) to be drawn from a wrap roll (not shown) within the cover 26 onto the roller 30, then fed from the roller 30 onto a net pan 36 or other path from the roller 30 to the baling chamber 18 and the bale contained therein. Starting the net onto the bale may be achieved in a more gradual movement using the arrangement of this disclosure compared to conventional methods, In contrast to conventional systems, the controlled start of a wrapping operation by the motor 24 can be executed relatively smoothly. In conventional systems, for example, a linear actuator (e.g., as discussed below with respect to FIG. 4) can be activated in order to apply tension to a belt of a belt drive system attached to a net roller (e.g., similar to the roller 30). When the tension is sufficiently increased, the net roller rotates to move the wrap material towards the bale. With such a system, however, fine control of the start of feeding can be difficult. With the motor 24, feeding of the wrap material can be started and accelerated considerably more smoothly, or in any manner of ways (e.g., abruptly) depending on the needs of a particular operation or preferences of a particular operator.

As the wrap material is fed by the roller 30 (as driven by the motor 24) towards the baling chamber 18, the bale within the baling chamber continues to rotate. Accordingly, when the wrap material is engaged by the bale, the rotation of the bale pulls the net wrap at a speed corresponding to the tangential speed of the radially outermost edge of the bale (i.e., the point at which the wrap material engages the bale). This can apply a stretch to the wrap material.

Applying an appropriate degree of stretch to wrap material can be important for various reasons. For example, wrap material that is not sufficiently stretched during a wrapping operation can fail to properly compress the bale or fail to maintain proper compression of the bale once the bale is released from the baling chamber. Further, wrap material that is over-stretched during a wrapping operation can rip or otherwise fail, with corresponding decompression or loss of baled crop material.

Under the disclosed system and method, the motor 24 can be usefully controlled in order to ensure that appropriate tension is applied to wrap material during a wrapping operation, and accordingly to ensure that an appropriate amount of stretch is applied to the wrap material. In some implementations, the motor 24 can be controlled to create relatively precise speed differences between the wrap material engaging the bale and the wrap material passing (or being moved) by the roller 30. In some implementations, once the wrap material is being pulled by the rotating bale, the controller 28 can cause the motor 24 to shut off, thereby allowing the natural rotational inertia of the rotor of the motor 24 to slow rotation of the roller 30. In some situations, this can produce an appropriate tangential speed difference between the roller 30 and the bale, such that wrap material moving between the roller 30 and the bale can be appropriately stretched.

In some implementations, the controller 28 can instead cause the motor 24 to apply torque against the feeding (e.g., counter-clockwise) rotation of the roller 30, thereby actively braking and slowing the roller 30. Again, with appropriate speed differences between the roller 30 and the bale, this can result in the application of appropriate stretch to the wrap material as the material is fed onto the bale. In some implementations, the controller 28 may cause the motor 24 to apply sufficient torque against the feeding rotation of the roller 30, that the roller 30 may rotate in a second, braking or stretching direction 48 that is counter to the feed direction 46 and to a net path direction 50 along the net pan 36 (e.g., clockwise, as illustrated in FIG. 3). This may be useful, for example, if the wrap material is configured to slip somewhat on the roller 30 during a wrapping operation, or if the counter-rotation of the roller 30 is to be applied in controlled bursts or intervals as a periodic braking or stretching force for the wrap material.

As noted above, a gearbox such as the gearbox 32 can be provided to cause the roller 30 to rotate a different speed than the output of the motor 24. In some implementations, control of the motor 24 to apply appropriate stretch to wrap material can account for the use of such a mechanism. For example, where the gearbox 32 is configured as a reducing gearbox to cause the roller 30 to rotate slower than the output shaft of the motor 24 (e.g., at ratios of 1:10 or smaller, for roller speeds of 300-500 rpm or less), the controller 28 can be configured to control the motor 24 with respect a target speed for the roller 30, as modified by the gearbox 32, rather than with respect to an absolute target speed for the motor 24. The gears within the gearbox 32 may provide mechanical coupling between the motor 24 and the roller 30, or various other drive mechanisms (e.g., belts, chains, etc.) may be used to couple the motor to the roller in addition to the gearbox. Furthermore, suitable gear reduction (e.g., sheaves, sprockets, etc.) may be incorporated in other such drive arrangements (e.g., belts, chains, etc.) such that the gearbox may not be needed.

The controller 28 can be used to control the motor 24 in various ways. In some implementations, the controller 28 can be used to apply current-based control to the motor 24. For example, using frequency-based or other monitoring, the controller 28 can operate to maintain (or approximately maintain) a target current for the motor 24, such that the motor 24 provides a corresponding target output torque. In some implementations, such a target current can be changed depending on the particular operation that is currently in progress. For example, a larger target current can be set and maintained at the start of a wrapping operation, as the motor 24 works independently of the bale to move wrap material from the roller 30 towards the baling chamber 18. At a later time in the wrapping operation, a lower target current (and/or a target current with opposite sign) can then be set and maintained.

In some implementations, the controller 28 can be configured to implement speed control (e.g., through open- or closed-loop speed control architecture). In this way, for example, appropriate stretch can be applied to wrap material through direct control of the speed of the motor 24 (and thereby the roller 30) rather than (or in addition to) through control of motor torque. In some implementations, speed control for the motor 24 may include monitoring of the speed of other components of the baler 10 (or other machines). In some implementations, in order to ensure that the speed of the motor 24 is appropriately matched to (or offset from) the rotational speed of the bale within the baling chamber 18, the controller 28 can be configured to determine a rotational speed of the roller 34 (or another roller for the belt system 22) or of the PTO shaft 14 (which can drive rotation of the roller 34 and other rollers). For example, sensors directed towards the roller 34 or the PTO shaft 14 can provide signals to the controller 28 indicative of the speeds of those respective components. The controller 28 can then control the motor 24 to provide an appropriate speed for the roller 30, while taking into account potential variations from a nominal or target speed for the bale itself.

As another example, the controller 28 can be configured to detect a more direct indicator of the rotational speed of the bale within the baling chamber 18. For example, features, devices or marks can be applied to a bale within the baling chamber 18 or can be included in (or on) wrap material applied to the bale. By tracking the movement or location of such features, devices, or marks, the controller 28 can accordingly determine the rotational speed of the bale. This information can then be used to determine an appropriate speed for the motor 24 (e.g., so as to apply appropriate stretch to the wrap material being fed onto the bale).

In some implementations, an operator can adjust the stretch applied to wrap material by setting particular parameters for the control architecture implemented by the controller 28. For example, an operator desiring a different level of stretch for wrap material may be able to adjust the gain of various control loops implemented by the controller 28, such that a greater or lesser degree of stretch (compared to a nominal value) can be applied.

In some implementations, the controller 28 can control the motor 24 (e.g., in one or more of the ways discussed above) to apply varying amounts of stretch to wrapping material throughout a wrapping operation. For example, the controller 28 can control the motor 24 to operate a different speeds during a wrapping operation such that the difference in tangential speeds between the roller 30 and the bale, and accordingly the amount of stretch applied to the wrap material, varies over the course of the wrapping operation. This may be useful, for example, in order to provide for looser (e.g., less tightly stretched) wrapping on inner layers of a wrapped bale and tighter (e.g., more tightly stretched) wrapping on outer layers of the wrapped bale. This may also be useful, for example, with the application of different types of material. For example, where different types of wrap material (e.g., net wrap, semi-permeable membranes, and so on) are combined into composite rolls, it may be useful to apply the different types of material (from the same roll) with different amounts of stretch. As another example, where multiple rolls of wrap material are used, different amounts of stretch can be applied to the different rolls. For example, wrap material applied from a first roll (e.g., the roll 30) can be applied with a first amount of stretch, and wrap material subsequently applied from a different roll (not shown) can be applied with a second, different amount of stretch. Similarly, where two rolls of wrap material are simultaneously applied (e.g., a first roll to the center region of a bale perimeter, and a second roll to one or both end regions of a bale perimeter) different amounts of stretch can be applied to the two rolls. In such a case, it may sometimes be useful to provide two wrap rollers (e.g., to provide another roller similar to the roller 30 or divide the roller 30 into independently rotating segments) and to control the rotational speed (or torque) of these separate rollers with separate motors (not shown).

Of note, real time variation in the feed velocity of (or torque applied to) wrap material is generally not possible in conventional machines, due to the need to manipulate mechanical spacers to change the speed of a wrap roller. Likewise, with conventional belt-driven, the constant rotation of drive rollers in a baler can result in the drive belt for a wrap roller never being completely released during operation of the baler. Accordingly, the drive belt may be subjected to relatively constant wear (albeit of varying intensity). This may necessitate not only regular maintenance on the belt, but also relatively regular adjustments to the belt-drive system in order to ensure that the worn belt continues to impart appropriate velocity to the wrap roller.

In some implementations, the controller 28 can be configured to cause the motor 24 to rotate opposite the feed path of the wrap material (e.g., clockwise, as depicted in FIGS. 2 and 3) in situations other than those noted above. For example, if wrap material becomes wound or otherwise tangled on the roller 30, it may be highly useful to implement powered rotation of the roller 30 (via the controller 28 and motor 24) in order to unwind or disentangle the wrap. In conventional systems, this must typically be done manually.

As another advantage of the disclosed system and method, various components of conventional wrapping systems can be eliminated or significantly downsized, thereby reducing manufacturing and maintenance costs, and general system complexity. As also discussed above, for example, use of a motor rather than a belt drive allows many components (e.g., the drive belt, tensioning and drive pulleys, brake structures and pads, and so on) to be eliminated from the baler.

Figure 4:
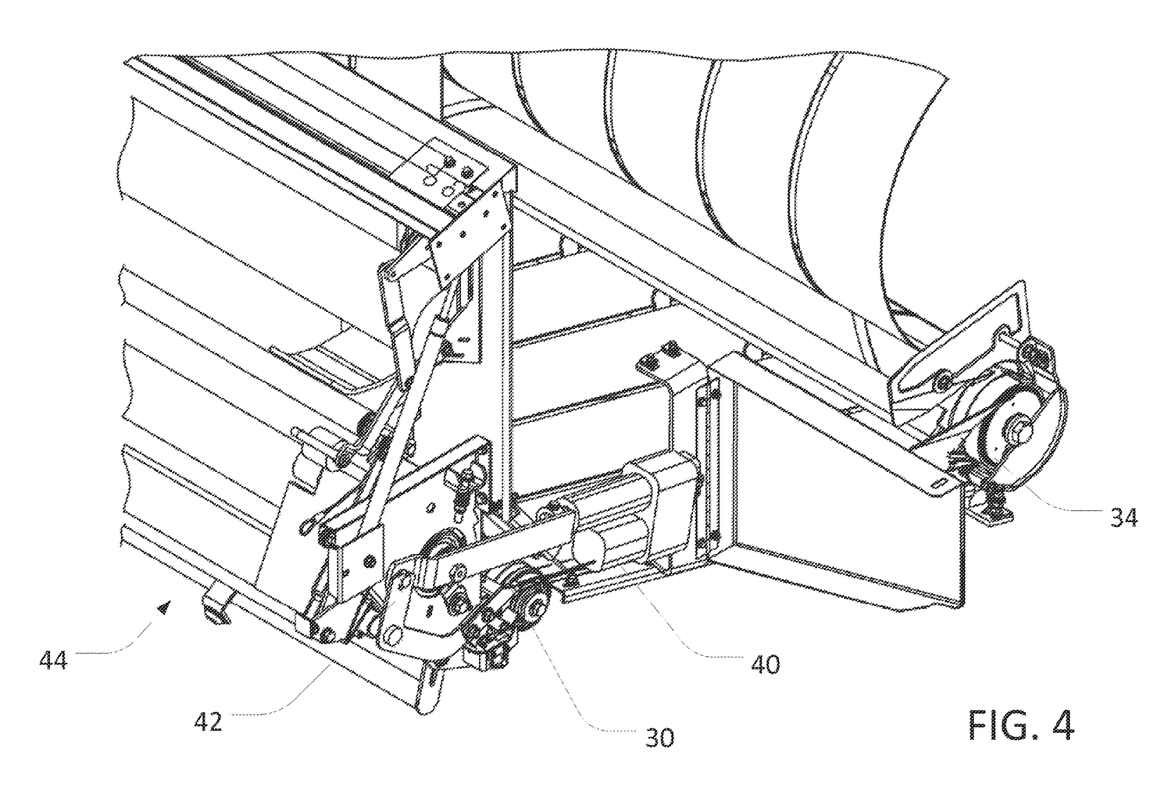
FIG. 4 is a partial right perspective view of the baler of FIG. 1, including an actuator arranged for use with the embodiments of the disclosed system.

Other actuators in conventional systems can also be downsized or eliminated. For example, FIG. 4 illustrates an actuator 40 configured as a linear actuator including an electric (or other) motor to extend or retract a screw. Movement of the screw causes movement of an arm 42, which pivots an assembly 44 that extends across the body of the baler 10. In conventional systems, this pivoting assembly 44 can serve multiple roles. As the assembly 44 pivots in a first direction (e.g., clockwise, as illustrated in FIG. 4), a tensioning pulley disposed on the opposite side of the baler 10 illustrated in FIG. 4 can engage the belt-drive in order to cause the wrap material to be moved towards the bale. As the assembly 44 pivots in a second, opposite direction (e.g., counterclockwise, as illustrated in FIG. 4), the assembly 44 can release the tensioning pulley while applying a brake to the wrap roller and moving a knife (not shown) into the net path 50 (see FIG. 3) in order to cut the knife. Because the motor 24 can be controlled directly and relatively precisely, many of these components (e.g., the tensioning pulley, the brake assembly and brake pad, and so on) can be eliminated from the baler 10. Further, because the actuator 40 may no longer need to move components to engage the belt-drive system or brake the roller 30, the actuator 40 can be configured to substantially smaller and less power-hungry than in conventional systems.

Additionally, the motor 24 can be controlled to reduce the force needed from the actuator 40 for cutting the wrapping material, or even to entirely eliminate the need for a cutting knife. For example, the controller 28 can be configured to control the motor 24 in order to apply sufficient tension to wrap material from the roller 30 that relatively little pressure from the knife (and, accordingly, from the actuator 40) may be needed to cut the wrap material. Indeed, in some implementations, the motor 24 can be controlled to sever the wrap material without the need for an articulating knife, or any knife at all. For example, when a bale has been appropriately wrapped, the controller 28 can be configured to cause the motor 24 to rotate strongly against the feed direction 46 of the wrap material (e.g., clockwise, as illustrated in FIGS. 2 and 3) or to strongly hold the wrap material against the rotation of the bale within the baling chamber 18, such that the wrap material can be severed by contact with a fixed cutting edge (e.g., a fixed knife) or based solely on the tension created between the bale and the motor 24. In this case, it may therefore be possible to entirely remove the actuator 40 from the baler 10, thereby further simplifying the baler design and further reducing associated manufacturing and maintenance costs.

Use of the disclosed system can also reduce the need for time-consuming calibration of the relevant baler or wrapping system. As also noted above, for example, control of the motor 24 can reduce the need to mechanically calibrate the rotational speed of the roller 30 with respect to a bale in the baling chamber 18. Additionally, through relatively precise control of the motor 24, the timing of various stages of a wrapping operation, including starting, tensioning, stopping, and cutting stages, can be controlled without the need for extensive calibration of a multitude of interoperating mechanical parts (e.g., tensioning pulleys, a cutting knife, brake mechanisms, and so on).

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A system for moving wrap material for agricultural crop packages within a baler with a wrap roller, the system comprising:
    a motor secured to the baler, the motor being configured to rotate the wrap roller;
    a controller configured to:
        cause the motor to rotate the wrap roller in a first direction, such that the wrap roller feeds the wrap material towards a crop package contained by the baler as the wrap roller is rotated by the motor in the first direction; and
        cause the motor to control the rotation of the wrap roller in one of the first direction and a second direction opposite the first direction throughout application of the wrap material to the crop package until the wrap material is severed between the wrap roller and the crop package;
        wherein the controller is configured to vary a rotational speed of the motor to vary the rotation of the wrap roll during application of the wrap material to the crop package independently of a rotational speed of the crop package; and
    a speed reduction device configured to apply a speed reduction to an output of the motor, such that the wrap roller is caused to rotate at a slower speed than the output of the motor.

2. The system of claim 1, wherein the controller is configured to actively brake the motor to stretch the wrap material.

3. A system for moving wrap material for agricultural crop packages within a baler with a wrap roller, the system comprising:
    a motor secured to the baler, the motor being configured to rotate the wrap roller; and
    a controller configured to:
        cause the motor to rotate the wrap roller in a first direction, such that the wrap roller feeds the wrap material towards a crop package contained by the baler as the wrap roller is rotated by the motor in the first direction; and
        cause the motor to control the rotation of the wrap roller in one of the first direction and a second direction opposite the first direction throughout application of the wrap material to the crop package until the wrap material is severed between the wrap roller and the crop package;
    wherein the controller is configured to vary a rotational speed of the motor to vary the rotation of the wrap roll during application of the wrap material to the crop package independently of a rotational speed of the crop package; and
    wherein the controller is further configured to apply current-based control to the motor, in order to stretch the wrap material.

4. The system of claim 1, wherein the controller is further configured to control the motor to stretch the wrap material based on detecting an indicator of rotational speed of the crop package.

5. The system of claim 1, wherein the controller is further configured to vary the rotational speed of the motor to apply varying amounts of stretch to the wrap material.

6. The system of claim 1, wherein the motor is secured to a rear portion of the baler.

7. The system of claim 1, wherein the controller is further configured to identify a degree of wrapping of the crop package based upon monitoring an operation of the motor.

8. The system of claim 7, wherein monitoring the operation of the motor includes counting a number of revolutions of the motor.

9. The system of claim 1, wherein the controller is further configured to cause the motor to one or more of brake the wrap roller relative to the first direction and rotate the wrap roller in the second direction, in order to sever the wrap material without using a knife.

10. A method for moving wrap material for agricultural crop packages within a baler with a wrap roller and a motor configured to rotate the wrap roller, the method comprising:
causing the motor to rotate the wrap roller in a first direction, such that the wrap roller feeds the wrap material towards a crop package contained by the baler as the wrap roller is rotated by the motor in the first direction;
causing the motor to control the rotation of the wrap roller in one of the first direction and a second direction opposite the first direction throughout application of the wrap material to the crop package until the wrap material is severed between the wrap roller and the crop package; and
varying a rotational speed of the motor to vary the rotation of the wrap roll during application of the wrap material to the crop package independently of a rotational speed of the crop package; and
causing the motor to one or more of brake the wrap roller relative to the first direction and rotate the wrap roller in the second direction, in order to sever the wrap material without using a knife.

11. The method of claim 10, wherein the motor is actively braked to stretch the wrap material.

12. The method of claim 10, further comprising:
applying a speed reduction to an output of the motor, such that the wrap roller is caused to rotate at a slower speed than the output of the motor.

13. The method of claim 10, further comprising:
applying current-based control to the motor, in order to stretch the wrap material.

14. The method of claim 10, further comprising:
controlling the motor to stretch the wrap material based on detecting an indicator of rotational speed of the crop package.

15. The method of claim 10, further comprising:
varying the rotational speed of the motor to apply varying amounts of stretch to the wrap material.

16. The method of claim 10, wherein the motor is secured to one of a front and a rear portion of the baler.

17. The method of claim 10, further comprising:
identifying a degree of wrapping of the crop package based upon monitoring an operation of the motor.

18. The method of claim 17, wherein monitoring the operation of the motor includes counting a number of revolutions of the motor.

\* \* \* \* \*